H. E. HAYWARD.
CHAIN LINK.
APPLICATION FILED JUNE 15, 1908.
993,248.
Patented May 23, 1911.
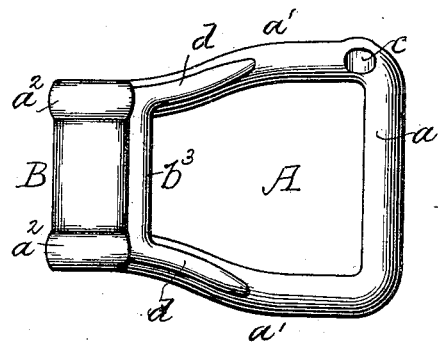
Fig. 1.
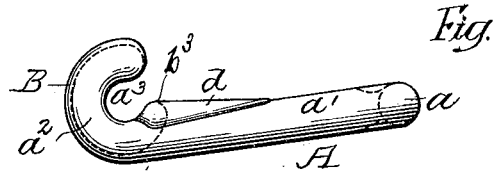
Fig. 2.
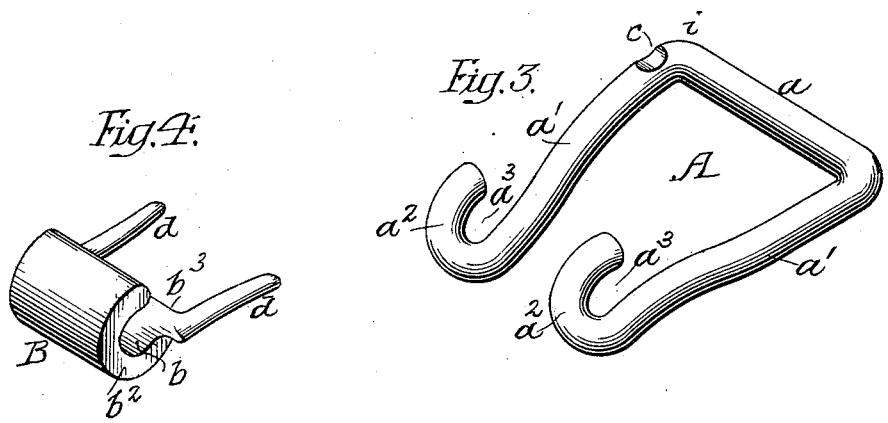
Fig. 4.
Fig. 3.
Witnesses:—
Willis A. Burrowes
Walter R. Pullinger
Inventor:—
Henry E. Hayward.
by his Attorneys.—
THE NORRIS PETERS CO., WASHINGTON, D. C.

UNITED STATES PATENT OFFICE.

HENRY E. HAYWARD, OF PHILADELPHIA, PENNSYLVANIA, ASSIGNOR TO LINK-BELT COMPANY, OF CHICAGO, ILLINOIS, A CORPORATION OF ILLINOIS.

CHAIN-LINK.

993,248.   Specification of Letters Patent.   Patented May 23, 1911.

Application filed June 15, 1908. Serial No. 438,587.

*To all whom it may concern:*

Be it known that I, HENRY E. HAYWARD, a citizen of the United States, residing in Philadelphia, Pennsylvania, have invented certain Improvements in Chain-Links, of which the following is a specification.

One object of my invention is to manufacture a substantial chain link at a comparatively small cost.

A further object of the invention is to reinforce the side members so that the link can be made from comparatively light material and yet will have the strength desired.

In the accompanying drawings:—Figure 1, is a plan view of a link made in accordance with my invention; Fig. 2, is a side view; Fig. 3, is a detached perspective view of the wire portion of the link bent into shape, and Fig. 4, is a detached perspective view of the socket member.

My invention relates particularly to the manufacture of what is known as an open detachable link having at one end a cross bar which engages an open socket at the opposite end of another link, so that the links can be readily coupled or uncoupled by turning one link in respect to the other and moving it laterally.

A is the body portion of the link and B is the socket. The body portion A is made of wire bent into shape. The wire is bent at $i$—$i$ to form the cross bar $a$ and the side members $a'$. The end of each side member is bent into the form of a hook $a^2$ and these hook members are spaced a given distance apart so that the socket member B can be placed between them. This socket member is recessed at $b$ on a line with the recesses $a^3$ in the hooked portions $a^2$.

$d$ are rearward extensions which rest upon the side members $a'$ of the body A and these extensions project laterally from the hook member, as clearly shown in Fig. 4 so that when the parts are assembled the extensions $d$ rest upon the upper surface of the side members $a'$ and are secured thereto by welding, preferably by the electric process. This construction adds considerable strength to that portion of the link directly back of the hooked member.

Where the side members of the link are bent there is a tendency to straighten out and this tendency is prevented by firmly securing the extensions $d$ to the side members, as shown. The hooked members $a^2$ may be welded to the ends $b^2$ of the socket member if additional strength is desired.

When the hooked members are positioned in respect to the socket member, I preferably exert enough pressure upon the parts to flatten the hooked members so as to give them a firm and wide bearing against the ends of the socket member. The hooked member is so formed at the rear as to provide a proper bearing surface $b^3$ for the teeth of the sprocket wheel and the shape of this bearing portion may be modified according to the type of teeth used and the rear portion $b^3$ is extended, as shown in Fig. 2, so as to properly close the socket for the cross bar. The link is reduced at $c$ to allow it to be detached from another link when moved laterally. It will be noticed, in this instance, that the body of the link is on a line tangential to the lower portion of the hooked member. The link may be made in this manner or the body portion of the link may be on the pitch line, if desired.

I claim:

1. The combination in a chain link, of a body portion bent into shape to form a transverse bar and side members, and a socket having extensions projecting rearwardly and secured to the side members of the body portion and reinforcing said side members.

2. The combination in a chain link, of a body portion having a transverse bar and hooked side members, and a socket mounted between the hooks of the body portion and having rearward extensions secured to the side members of the links.

3. The combination in a chain link, of a body portion having a transverse bar and hooked side members, and a hooked socket mounted between the hooked portions of the side members and having rearward extensions resting upon the side members and secured thereto by welding.

In testimony whereof, I have signed my name to this specification, in the presence of two subscribing witnesses.

HENRY E. HAYWARD.

Witnesses:
 Jos. H. KLEIN,
 WM. A. BARR.

Copies of this patent may be obtained for five cents each, by addressing the "Commissioner of Patents, Washington, D. C."